United States Patent
Morlec et al.

[11] Patent Number: 5,879,432
[45] Date of Patent: Mar. 9, 1999

[54] PROCESS AND DEVICE FOR SCRUBBING FLOWS OF GASEOUS EFFLUENTS LOADED WITH POLLUTING SUBSTANCES

[75] Inventors: Jean Morlec; Jacques Bourcier, both of Saint-Nazaire, France

[73] Assignees: Institut Francais du Petrole, Rueil-Malmaison; Jacques Bourcier, Saint Nazaire, both of France

[21] Appl. No.: 836,286

[22] PCT Filed: Sep. 6, 1996

[86] PCT No.: PCT/FR96/01367

§ 371 Date: May 7, 1997

§ 102(e) Date: May 7, 1997

[87] PCT Pub. No.: WO97/09109

PCT Pub. Date: Mar. 13, 1997

[30] Foreign Application Priority Data

Sep. 7, 1995 [FR] France ................................. 95/10591

[51] Int. Cl.⁶ .................................................. B01D 53/04
[52] U.S. Cl. ................................ 95/114; 95/116; 95/123; 95/148; 96/122; 96/126; 96/130; 96/144
[58] Field of Search ..................... 55/284, 302; 95/106, 95/114–116, 123, 148; 96/121–130, 133, 144

[56] References Cited

U.S. PATENT DOCUMENTS

| | | | |
|---|---|---|---|
| 2,101,555 | 12/1937 | Moore et al. | 96/127 X |
| 2,519,296 | 8/1950 | Simpson | 96/126 |
| 2,662,607 | 12/1953 | Moragne | 96/125 |
| 3,203,110 | 8/1965 | Führing et al. | 96/144 X |
| 3,292,346 | 12/1966 | Adams | 96/122 |
| 3,545,180 | 12/1970 | Schrag | 55/302 X |
| 3,555,785 | 1/1971 | Wooldridge et al. | 55/302 X |
| 3,683,591 | 8/1972 | Glav | 95/123 X |
| 3,902,874 | 9/1975 | McAndrew | 96/122 X |
| 4,212,655 | 7/1980 | Degenhardt et al. | 96/123 X |
| 4,269,611 | 5/1981 | Anderberg | 96/124 |
| 4,365,979 | 12/1982 | Takeyama et al. | 96/123 |
| 4,895,580 | 1/1990 | Morioka et al. | 96/144 X |
| 4,946,479 | 8/1990 | Izumo | 96/123 |
| 4,966,611 | 10/1990 | Schumacher et al. | 96/126 X |
| 5,057,128 | 10/1991 | Panzica et al. | 96/123 |
| 5,176,798 | 1/1993 | Rodden | 96/122 X |
| 5,547,640 | 8/1996 | Kim | 96/124 X |
| 5,628,819 | 5/1997 | Mestemaker et al. | 96/122 |

FOREIGN PATENT DOCUMENTS 1607907  11/1990  U.S.S.R. .................................. 96/130

*Primary Examiner*—Robert Spitzer
*Attorney, Agent, or Firm*—Antonelli, Terry, Stout & Kraus, LLP

[57] ABSTRACT

A process and device for scrubbing flows of gaseous effluents loaded with polluting substances, wherein the effluents are caused to circulate through a device including an array of scrubber units (4a to 4n) juxtaposed in an enclosure (3), each containing materials adsorbing the substances. When the adsorbing load thereof is saturated and for the scrubber units (4) to regain the scrubbing capacity thereof, they are selectively and successively isolated by a mobile collector (8) during the time required for their desorption by heating and for the substances to be transferred by an auxiliary fluid (a fraction of the circulating effluents for example or a gas delivered selectively to the inlet of the scrubber unit to be desorbed by an auxiliary circuit), and the substances mixed with the auxiliary fluid are possibly transferred towards a reactor (10) suited for removing them. The process can be applied for concentrating and scrubbing of polluting substances such as VOCs or gas dehumidification.

16 Claims, 2 Drawing Sheets

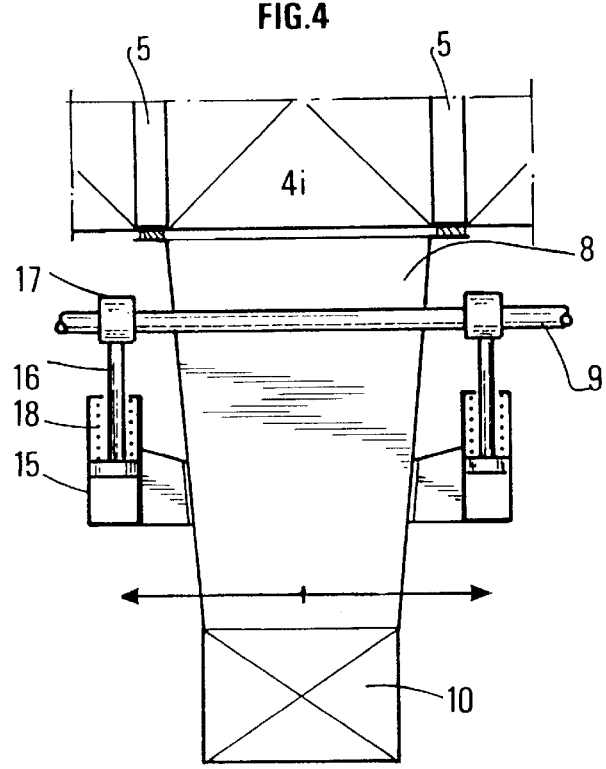
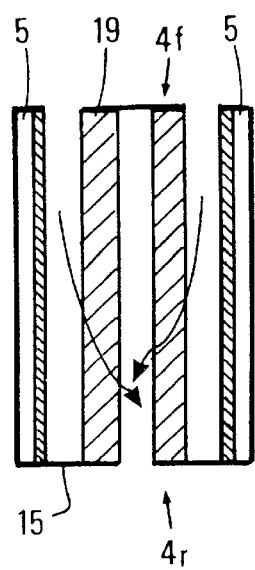
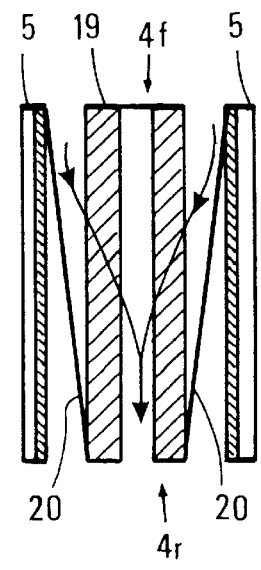
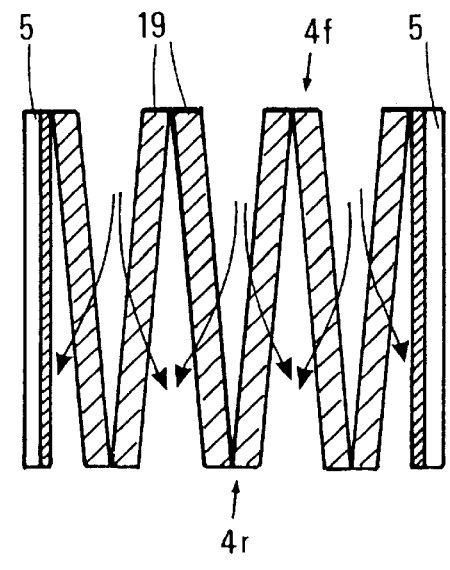

PROCESS AND DEVICE FOR SCRUBBING FLOWS OF GASEOUS EFFLUENTS LOADED WITH POLLUTING SUBSTANCES

FIELD OF THE INVENTION

The present invention relates to a process and to a device for scrubbing gaseous effluent flows.

The process and the device according to the invention find application notably in the removal of Volatile Organic Compounds, hereafter referred to as VOCs, or of malodorous substances. The term VOC includes the hydrocarbons, the chlorine, fluorine and chlorofluorine compounds, the NOx, the SOx, $H_2S$ and mercaptans, $NH_3$ and amines, including $H_2O$, and more generally all the organic and inorganic compounds that may be present in air at concentrations that are inconvenient on several accounts.

Greater respect for the environment has become one of the major concerns of many industrialists who have to face more stringent regulations relative to polluting discharges to the atmosphere.

BACKGROUND OF THE INVENTION

There are many devices intended for scrubbing gaseous effluents in industry, that work mainly by adsorption of the polluting substances on adsorbing materials or by terminal separation through a filter. After scrubbing in contact with the adsorbent, the scrubbed effluents can be discharged to the atmosphere or recycled in premises at least during winter time so as to decrease heating costs.

In certain types of devices, using for example activated carbon filters working according to the principle of cohesive force and of retention by chemisorption, the adsorbents are not regeneratable and they must be replaced as soon as the saturation threshold thereof is reached. The granular activated carbon used in some other filters can be regenerated at the plant provided that it is returned to the maker. A few days of activity of the polluting plant are sometimes enough to reach this saturation threshold when the initial polluting substance concentration is high. The cost of the adsorbent or the regeneration thereof quickly becomes prohibitive. This solution of filters with non regeneratable consumables is in any case unacceptable in an ecobalance since the pollution is in this case merely transferred from one support to another without being eliminated. Because of the replacement costs, of the lack of information and sometimes of difficulties in checking the condition of the devices, it often happens that the filters are not changed as frequently as they should.

There are also scrubbing devices with adsorbent regeneration by desorption and recovery or destruction of the polluting substances. However, these devices are often more expensive. They are rather suitable for facilities generating large amounts of polluting substances. In many cases, such devices most often do not constitute economically acceptable solutions. Many facilities are therefore not adequately equipped.

U.S. Pat. No. 3,608,273 for example or patent applications FR-A-2,659,869 and FR-A-2,709,431 describe processes for treating fluids loaded with substances to be eliminated, notably consisting in passing these fluids into tanks through a series of spaced-out filter layers containing an adsorbing material such as activated carbon for example. An adsorbing material that is electrically conducting or made conducting by adding conducting particles or heating wire is used. Desorption of the adsorbate is performed by heating it by means of an electric current running therethrough or of an electro-magnetic field produced by a winding. Two arrays of filter layers may be used and one is used in adsorption while the other is regenerated.

The claimants' patent application FR-94/06,281 describes a continuous scrubbing device for polluted effluents. It includes an internally chambered ring of vertical axis loaded with a particulate solid material adsorbing the polluting substances: silica, activated carbon, alumina or others, and continuously rotating inside a cage. A permanent circulation of gaseous effluents is established on the one hand between an effluent delivery line and an exhaust line in the central area via a first angular adsorption section of the ring, and on the other hand between a hot gaseous flow delivery line in the same area and an exhaust line via a second angular desorption section of the ring, where the adsorbate is regenerated. The lines are connected to external heat exchange and/or incineration means. This device can be associated with many types of polluting plants, but it is more particularly intended for those producing relatively high rates of polluted effluents (10,000 to 100,000 m3/h for example).

SUMMARY OF THE INVENTION

The device for scrubbing substances mixed with gaseous effluents according to the invention includes an enclosure, a first line for canalizing the effluents in the enclosure, scrubbing means for holding the substances back and for concentrating them, at least a second line for discharging the filtered effluents out of the enclosure and means (such as a fan) inside the enclosure for example, for self-contained scrubbing, or outside if the scrubbing device is integrated in an existing global process for establishing a circulation of effluents through the enclosure.

It is characterized in that the scrubbing means comprise a fixed scrubbing barrier interposed across the enclosure and including a plurality of scrubber units placed parallel to one another, containing a material suited for adsorbing the substances, and a selective thermal desorption assembly allowing application of a desorption fluid of relatively low flow rate to at least one scrubber unit, comprising a mobile collector that can be shifted linearly in the enclosure, suited for gathering selectively all the desorption fluid coming from this scrubber unit, and means for heating the adsorbing material of each scrubber unit to be desorbed.

The device can also comprise means such as an incineration reactor preferably placed in the enclosure and secured to the collector in translation in order to remove the substances mixed with the desorption fluid.

According to an embodiment, the device includes a ventilation circuit partly situated outside the enclosure in order to establish selectively a circulation of the desorption fluid through each scrubber unit to be desorbed. This circuit includes for example at least one auxiliary line that can be shifted at the same time as the mobile collector, so as to send the desorption fluid towards each scrubber unit selected and/or possibly at least one auxiliary line, that can also be shifted at the same time as the mobile collector, for driving the desorption fluid coming from the selected scrubber unit out of the enclosure.

According to an embodiment, the means for heating the adsorbing material (with resistors within the adsorbent or by Joule effect for example) are included in each scrubber unit.

According to another embodiment, part of the heating means is placed outside each scrubber unit and may consist of a source of infrared rays, such as for example an incineration reactor at the outlet of the scrubber unit to be desorbed.

According to an embodiment, each scrubber unit includes several perforated panels containing adsorbent and deviation walls intended to increase the surface of contact of the effluents with the adsorbing material.

The desorption assembly preferably comprises motive means for positioning the collector in front of any scrubber unit to be desorbed and for pressing it against the unit.

The process for scrubbing substances mixed with gaseous effluents according to the invention is characterized in that a circulation of effluents is established through a device including an array of scrubber units juxtaposed in an enclosure, containing each materials for adsorbing said substances, the various scrubber units are selectively and successively isolated by means of a mobile collector when the adsorbing load thereof is saturated, during the time required for the desorption thereof by heating and for the transfer of the substances by an auxiliary fluid (a fraction of the circulating effluents for example or a gas delivered selectively to the inlet of the scrubber unit to be desorbed by an auxiliary circuit), and the substances mixed with the auxiliary fluid are possibly transferred towards a reactor suited for removing them.

The device according to the invention provides a simple solution of moderate cost price and upkeep cost, compatible with many facilities generating average polluting effluent rates (1000 to 5000 m3/h for example), because of many factors:

- the enclosure can be economically made from the same material as that used for manufacturing the main and auxiliary lines (air ducts), with a parallelepiped shape of constant section, that is standard and easy to assemble. Galvanized steel, polyester or, if need be, stainless steel can be used for example;
- there are few moving parts since the desorption assembly with the mobile collector and the optional auxiliary lines thereof can be readily translated by electrical, pneumatic or hydraulic means;
- the high temperature rises necessary for desorption are confined in the thermal reactor and in a single desorption unit. Since these scrubber units are thermally insulated from one another and from the enclosure body, thermal insulation of the enclosure is not necessary.

Incineration of the pollutants is preferably performed inside the enclosure, in the immediate neighbourhood of the scrubber unit to be desorbed, with the advantage that the desorption heat can be partly provided by an infrared radiation.

- The optional desorption and incineration operations can be readily postponed until off-peak periods, which allows the energy expenses required to be reduced;
- the concentration and the nature of the polluting substances, as well as the temperature of the effluents, may vary within a wide range without harming the effectiveness of the treatment;
- since the device remains static during all the working phases, the enclosure being at underpressure in order to establish the circulation inside, no leak is possible towards the outside;
- the simplicity of construction, of use and of operation facilitates maintenance and limits servicing and control frequency;
- it is not necessary to double the desorption means as in conventional processes.

BRIEF DESCRIPTION OF THE DRAWINGS

Other features and advantages of the device according to the invention will be clear from reading the description hereafter of embodiments given by way of non limitative examples, more particularly suited for polluted effluent scrubbing applications, with reference to the accompanying drawings in which:

FIG. 6 shows a variant of the embodiment of FIG. 5, and FIG. 7 shows another variant of the embodiment of FIG. 5.

DESCRIPTION OF THE PREFERRED EMBODIMENTS

As will be described in detail hereunder, the process according to the invention mainly consists in placing an array of juxtaposed scrubber units containing adsorbing materials on the path of a circulation of effluents to be processed and in successively isolating, by means of a collector, each of the units when the adsorbing load thereof is saturated, during the time required for the desorption thereof by heating and for the transfer, by means of an auxiliary fluid, of the substances held back by the adsorbent. The process can apply to the dehumidification of gas or to the scrubbing of effluents containing polluting substances. In this case, the process preferably comprises transferring the substances towards an incineration reactor placed, for example, in the immediate neighbourhood of the unit in the process of being desorbed.

Figure 1:
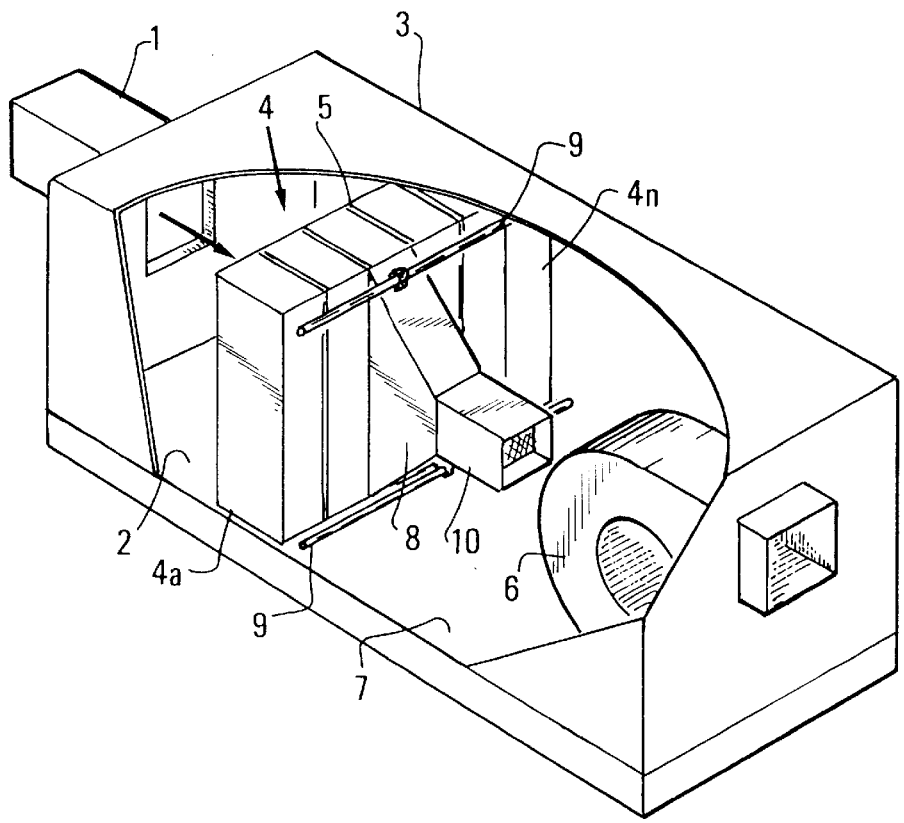
FIG. 1 shows an overall view in partial section of the device.

The polluted effluent to be processed is delivered through a duct 1 into an inlet chamber 2 at a first end of a rigid enclosure 3 made in one piece (FIG. 1), that may have a parallelepiped shape for example and be made, for a general use, from galvanized steel. The whole cross-section of the enclosure is closed by a scrubbing barrier 4 consisting of a series of juxtaposed scrubber units 4a to 4n (n being equal to 11 for example) separated from one another by layers made from a thermally insulating material 5. Each of these scrubber units contains an adsorbing material suited to the nature of the substance mixed with the effluent to be processed, notably in the form of polluting molecules. This adsorbing material may be, for example, activated carbon, zeolites, etc, as described in detail hereafter.

Circulation of the effluent through scrubber units 4a to 4n is provided by a fan 6 placed in an extraction chamber 7 on the side of the scrubbing barrier 4 opposite inlet chamber 2, or possibly outside the enclosure when the scrubbing device is integrated in a global assembly. After passing through barrier 4, the scrubbed effluent is either discharged out of enclosure 3 to the atmosphere or recycled to the facility where it was sucked.

The adsorbing material load has to be regenerated at regular intervals depending on the saturation rate thereof. To that effect, the device includes a selective thermal desorption assembly allowing selective isolation of at least one scrubber unit from filtering barrier 4 during the time required for desorption.

This assembly includes a convergent mobile collector 8 whose inlet is suited for resting against the whole of the rear face of a scrubber unit 4a to 4n. This collector is mobile crosswise along guide rails 9 under the action of motive means (FIG. 4).

The desorption assembly also includes means for heating the adsorbent load inside or outside each scrubber unit. When the adsorbent used is granular, fixed embedded resistors (not shown) can be used to that effect. If the adsorbent is contained in a honeycomb structure, or in textile or even granular form of reduced thickness, it is also possible to use infrared-ray emitters mobile with collector 8, that can be placed in front of the front and rear faces of a scrubber unit to be desorbed. The thermal waves penetrate axially deep into the cells and the adsorbent, that is very porous, quickly heats up. With this type of radiation, most of the heat enters the adsorbent, and the heating of the air is merely due to the matter-gas conduction.

When the adsorbing material is sufficiently electricity-conductive, another heating mode may consist in applying a potential difference between the front and the rear faces and in heating it by Joule effect.

The polluting particles released by heating the material are driven out of the scrubber unit by a low flow rate fluid so as to obtain a high desorption rate at the outlet. Various means will be described hereafter in connection with FIGS. 2, 3.

An incineration reactor 10 intended for the polluting substances carried along by the auxiliary fluid is placed at the outlet of the convergent collector.

Destruction can be obtained thermally at high temperature (1000° C. for example). In this case, a combustion chamber containing for example a mattress of conducting wires with a high specific surface: 1500 m2/m3 for example is used, these wires being incandesced by applying an electric current, oxidation occurring in contact with the wires. The reaction is sufficiently exothermic for supporting the incandescence alone and no electric energy supply is required any longer.

Destruction can also be obtained at a lower temperature (of the order of 400° C.) in a catalytic oxidation reactor of a well-known type containing, for example, a honeycomb catalyst block, the gas oxidizing in contact therewith. In such a reactor, auxiliary heating means such as a burner, for example, are used to reach the oxidation starting temperature, that is thereafter supported by the oxidation autothermicity.

The effluent entering enclosure 3 (FIG. 1) can be used as an auxiliary desorption fluid itself, provided that the driving power of fan 6 is highly reduced during the regeneration phase. This embodiment is suitable for example in plants where cyclic decreases in the pollution rate of the effluent occur (at night, for example, when this pollution is linked with diurnal activities for example).

It is also possible to use a fraction of the effluent itself as an auxiliary desorption fluid. The regeneration rate per unit area, comparatively lower, is obtained by self-balancing of the circuit because of the greater pressure drop in the succession of elements under desorption in relation to the single adsorption means. This principle requires only one fan.

Figure 2:
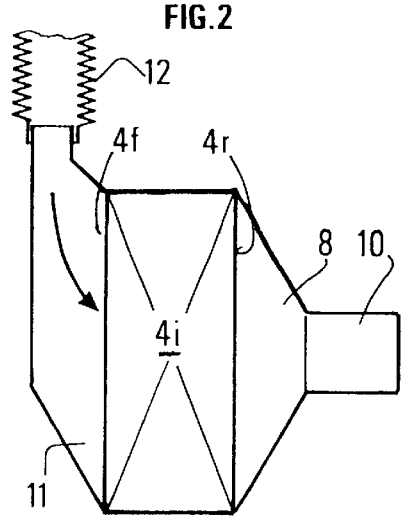
FIG. 2 diagrammatically shows a variant of the embodiment of FIG. 1 with an auxiliary desorption flow delivery line, FIG. 3 diagrammatically shows a variant of the embodiment of FIG. 1 with an auxiliary desorption flow delivery line and an exhaust line for discharging the desorption flow towards an external incineration reactor, FIG. 4 diagrammatically shows the motive means allowing the desorption assembly to be shifted, FIG. 5 diagrammatically shows a first embodiment of a scrubber unit with several compartments.

When the pollution rate of the effluent remains too high for it to be used as an auxiliary fluid, the embodiment of FIG. 2 can for example be used, which comprises a divergent 11 whose outlet is shaped to be pressed against the whole of the rear face of each scrubber unit 4i, and whose inlet is connected to a supply pipe 12 communicating, outside enclosure 3, with a source of fluid (not shown) such as a fresh air fan for example. This divergent is preferably coupled with the collector on the other side of scrubbing barrier 4 and it moves therewith and with incineration reactor 10.

Figure 3:
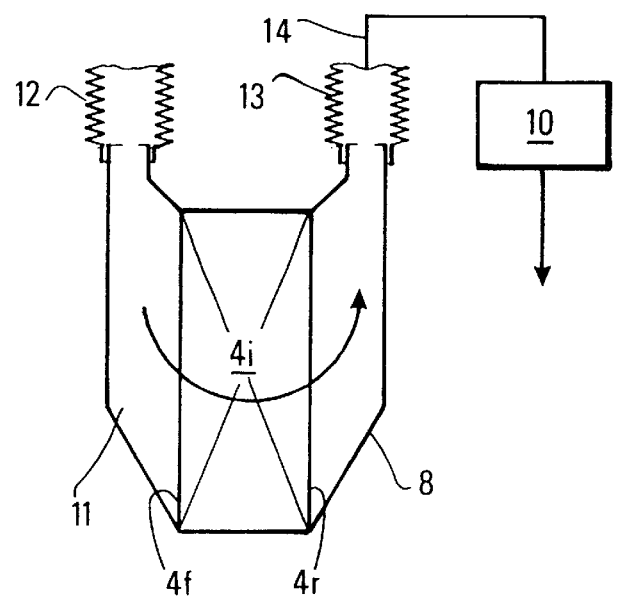

According to the variant of FIG. 3, the incineration reactor 10 or a recovery device can optionally be placed outside the enclosure. In this case, the outlet of collector 8 is also connected to a supply pipe 13 and a connection circuit 14 to reactor 10.

The motive means allowing collector 8, reactor 10 (FIG. 1) and/or divergent 11 (FIGS. 2, 3) to be shifted include for example (FIG. 4):

- linear guide means 9 of a well-known type comprising, for example, cylindrical ball or felt slide rails, running rails for rollers or other standard guide mechanisms allowing linear displacement in a single degree of translation,
- motive elements of a well-known type (not shown) including, for example, gear wheels (resp. toothed pinions) co-operating with a chain (resp. a toothed belt) and an electric, hydraulic or pneumatic motor, or a rubber wheel rolling on a fixed race, a gear pinion rolling on a linear toothed rule or a pneumatic jack with rope and pulley-wheel return, or more generally any driving gear commonly used by the man skilled in the art,
- a longitudinal translation mechanism allowing collector 8 to be pressed against a scrubber unit 4i to be desorbed. Collector 8 is secured to the body 15 of two hydraulic (or pneumatic) jacks whose rods 16 are rigidly connected respectively to two rings 17 that are mounted sliding on guide rails 9. Return springs 18 are interposed between the body and the rod of each jack and have the effect of pressing permanently collector 8 against the rear face 4r of the scrubber unit to be desorbed. Intermittent withdrawal of collector 8 during the time required for the transfer thereof to another scrubber unit is obtained by applying to the jacks a hydraulic pressure provided by a generator (not shown).

According to possible embodiment variants known to technicians, the mechanism may comprise for example an electromagnet with return spring or a feeler sliding on a fixed cam, bearing at regular intervals bosses, stops whose position and height are suited to the desired withdrawal.

Stopping of collector 8 in front of the rear face of a selected scrubber unit can be conventionally obtained by controlling the required translation distance, for example by means of a control unit (not shown), or by using a linear displacement electric motor provided with a torque limiter and by raising, in front of the scrubber unit selected, a stop ring causing the engine to stop. Pickups suited for detecting the saturation of the adsorbent in each scrubber unit can be associated with this control unit so as to automate the regeneration cycles.

It is for example possible to use as adsorption materials:
natural granular zeolites,
synthesis, dealuminized and/or graft zeolites,
impregnated zeolites on honeycomb or metal support,
bagged zeolites or A.C. (activated carbon),
granular A.C.,
fabrics, felts or metal or polymeric knitted fabrics covered with zeolite or A.C.,
activated carbon (A.C.) fabrics.

According to the embodiment of FIG. 5, each scrubber unit 4a to 4n includes several flat compartments 19 placed in parallel or according to an accordion pattern between the front and the rear faces 4f and 4r of scrubbing barrier 4, with a space between them. Each one of them is laterally delimited by perforated plates and filled with an adsorbing material such as activated carbon for example. Some inlets and outlets on the front 4f and rear 4r faces are closed so as to lengthen the path of the effluents and thereby to increase their surface of contact with the adsorbent.

This flow deviation can also be obtained (FIG. 6) by means of deflecting plates 20 arranged slantwise between the various compartments. This layout is favourable to the transmission of the infrared radiation when this heating mode is used to desorb the adsorbent of the various compartments.

According to the variant of FIG. 7, each scrubber unit comprises a plurality of flat compartments 19 arranged in a zigzag pattern so as to compel the effluent to flow therethrough.

The device such as it has been described can be implemented in many fields and notably:

- in car body repair shops to eliminate solvents from the painting booths,
- in waste water pumping-up stations in towns, to eliminate the hydrogen sulfide,
- in plastics processing shops, to clean the gaseous effluents loaded with styrene,
- in water treating plants for the processing of smells from the sludge filtering facilities,
- by painters in order to gather, clean and recycle solvent emanations (neoprene glue) in situ,
- in the building industry and civil engineering, for the treatment of confined places with air recycling possible while epoxy resins or polyurethane foams are being applied,
- for printing works, to clean gaseous discharges loaded with VOCs,
- in food processing shops to destroy smells,
- in the food processing industry to prepare air free of pollutants (NOx, $C_2H_4$),
- in emergency services where a self-contained mobile device is required,
- in all industries where purified air is required,
- in chemical production processes in order to clean gaseous effluents,
- in test laboratories, also to clean gaseous effluents prior to discharging them to the atmosphere,
- in mechanical workshops in order to treat working premises allowing authorized recycling.

Embodiments where the device is used to scrub an effluent loaded with polluting substances or particles (notably VOCs) have been described. However, without departing from the scope of the invention, the device may be used to dehumidify a gas. In such a case, the load of the various scrubber barriers consists of a hydrophilic adsorbent: natural or synthesis zeolites, silicagel, silica, alumina, silica-alumina, calcium chloride or lithium chloride, etc, or any other hydrophilic materials with a large active surface.

We claim:

1. A process for scrubbing gaseous effluents containing unwanted substances, wherein the effluents to be scrubbed are driven towards a scrubbing barrier placed across an enclosure, including a plurality of scrubber units containing a material suited for adsorbing and concentrating said substances, and the various scrubber units are selectively and successively isolated by means of a mobile collector when the adsorbing load thereof is saturated, so as to drive a desorption fluid therethrough, comprising selective thermal desorption of at least one scrubber unit combined with destruction of the substances obtained by selective desorption.

2. A process as claimed in claim 1, wherein the desorption fluid is a fraction of the effluents to be scrubbed.

3. A process as claimed in claim 1, wherein the desorption fluid is a gas delivered selectively to the inlet of the scrubber unit to be desorbed through an auxiliary circuit.

4. A device for scrubbing gaseous effluents containing unwanted substances, comprising an enclosure, a first line for canalizing the effluents towards a scrubbing barrier placed across the enclosure, including a plurality of scrubber units containing a material suited for adsorbing and concentrating said substances, at least a second line for discharging the filtered effluents out of the enclosure, means for establishing a circulation of effluents through the enclosure, and a mobile combined assembly, placed in the enclosure downstream from the scrubbing barrier and co-operating with a desorption fluid upstream from the barrier, that performs both selective thermal desorption of at least one of the plurality of scrubber units and destruction of the substances obtained through selective desorption.

5. A device as claimed in claim 4, wherein the mobile combined assembly comprises an incineration reactor intended for incineration of the substances obtained through selective desorption, associated with a collector and with translation means.

6. A device as claimed in claim 5, wherein the incineration reactor is a catalytic type reactor.

7. A device as claimed in claim 4, wherein the desorption fluid is delivered by the first line canalizing the effluents to be scrubbed.

8. A device as claimed in claim 4, further comprising an auxiliary desorption flow delivery line for delivering the desorption fluid to the at least one of the plurality of scrubber units cooperating with the mobile combined assembly, the auxiliary desorption flow delivery line comprising an air duct placed partly outside the enclosure, and a divergent having an inlet connected to the air duct and an outlet adapted to be operably connected to an upstream side of the at least one scrubber unit.

9. A device as claimed in claim 4, wherein the mobile combined assembly includes heating means for heating the adsorbing material included in each scrubber unit.

10. A device as claimed in claim 9, wherein the heating means include an array of resistors inside the adsorbent.

11. A device as claimed in claim 9, wherein the heating means are Joule effect heating means.

12. A device as claimed in claim 4, wherein the mobile combined assembly includes heating means placed outside each scrubber unit.

13. A device as claimed in claim 12, wherein the heating means include at least one source of infrared rays.

14. A device as claimed in claim 12, wherein the heating means include at least one source of the infrared rays.

15. A device as claimed in claim 4, wherein each scrubber unit includes several perforated compartments containing adsorbent and deflecting plates intended to increase the surface of contact of the effluents with the adsorbing material.

16. A device as claimed in claim 4, wherein the selective thermal desorption assembly comprises motive means for positioning the collector in front of any scrubber unit to be desorbed and for pressing it against the unit.

* * * * *